United States Patent [19]

Rasmussen

[11] 3,923,801

[45] Dec. 2, 1975

[54] OXAZINOBENZOTHIAZINE 6,6-DIOXIDES

[75] Inventor: Chris Royce Rasmussen, Ambler, Pa.

[73] Assignee: McNeil Laboratories, Incorporated, Ft. Washington, Pa.

[22] Filed: Sept. 23, 1974

[21] Appl. No.: 508,115

[52] U.S. Cl. ............................ 260/243 R; 424/246
[51] Int. Cl.² ....................................... C07D 279/02
[58] Field of Search ................................ 260/243 R

[56] References Cited
UNITED STATES PATENTS 3,646,020  2/1972  Zinnes et al. ...................... 260/243

3,853,862  12/1974  Lombardino ...................... 260/243

*Primary Examiner*—John M. Ford

[57] ABSTRACT

5-Alkyl-3-aryl-2H,5H-1,3-oxazino-[5,6-c] 1,2-benzothiazine-2,4(3H)-dione 6,6-dioxides are disclosed. The compounds have anti-inflammatory properties and are useful as components of antiarthritic compositions. Also included are novel intermediates used in the synthesis of said benzothiazine dioxides.

5 Claims, No Drawings

OXAZINOBENZOTHIAZINE 6,6-DIOXIDES

DESCRIPTION OF THE INVENTION

This invention relates to novel oxazino-benzothiazine-6,6 dioxides and; more particularly, to 5-alkyl-3-aryl-2H,5H-1,3 oxazino-[5,6-c]1,2-benzothiazine-2,4(3H)-dione 6,6-dioxides represented by the structure:

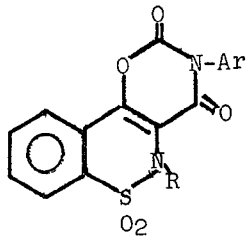

(I)

In this, and succeeding formulas, R is lower alkyl and Ar is an aryl radical selected from the group consisting of phenyl and substituted phenyl. By "substituted phenyl" is meant phenyl substituted with at least one substituent, preferably 1 to 2 substituents, selected from lower alkyl, lower alkoxy, halo and trifluoromethyl. When more than one substituent is present, they may be the same or different. By "lower" in the foregoing expressions "lower alkyl" and "lower alkoxy" is meant a straight or branched hydrocarbon chain having from 1 to about 6 carbon atoms such as, for example, methyl, ethyl, propyl, sec. butyl, n-pentyl, isoamyl, n-hexyl, isobutyl, etc. The expression "halo" is meant to include bromo, chloro, fluoro and iodo.

Among the preferred compounds are those in which Ar is phenyl and R is methyl or ethyl.

The compounds are generally crystalline solids, soluble in many organic solvents such as dimethylformamide, dimethyl sulfoxide, ketones such as acetone, 2-butanone; ethers such as tetrahydrofuran, dioxane; halohydrocarbons such as dichloroethane, etc., and of low solubility in water and aliphatic hydrocarbon solvents. The compounds have anti-inflammatory properties and are adapted to be employed in anti-arthritic compositions.

The novel compounds of Formula I may be prepared by contacting an alkyl N-(2-alkyl-4-hydroxy-2H-1,2-benzothiazine 3-carbonyl)carbanilate 1,1-dioxide alkali metal derivative compound (II) with an acid. The expression "alkyl N-(2-alkyl-4-hydroxy-2H-1,2-benzothiazine-3-carbonyl)carbanilate 1,1-dioxide alkali metal derivative compound" hereinafter referred to as "alkali metal compound" is intended to embrace both the unsolvated form (IIa) and the solvated form (IIb) represented below. The reaction may be represented schematically as follows:

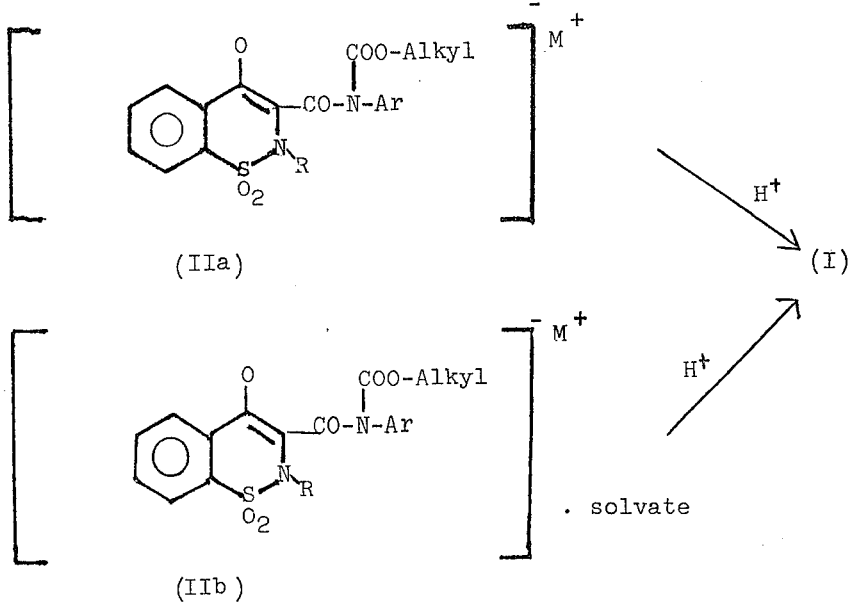

In the foregoing formulas, $M^+$ represents an alkali metal cation such as sodium, potassium, lithium, etc. The solvate of Formula IIb is of an ethereal solvent such as dimethoxyethane, dioxane, tetrahydrofuran, dimethyl ether of diethylene glycol, etc., and may also have water of hydration.

The alkali metal compound of Formula II which may be prepared by the reaction of a 2-alkyl-4-hydroxy-2H-1,2-benzothiazine-3-carboxanilide 1,1-dioxide compound (hereinafter called "carboxanilide compound") represented by the formula

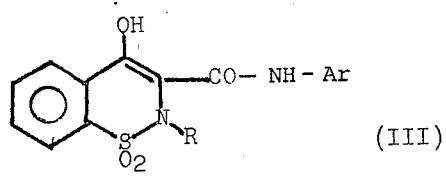

(III)

and a haloformic ester, preferably an alkyl chloroformate represented by the formula

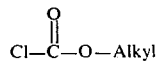

(IV)

in the presence of an alkali metal base, preferably an alkali metal hydride, may be isolated and employed as a solvate (Formula IIb) or be employed as formed in the reaction mixture (as IIa) without isolation or purification. (It is to be understood that the compounds of Formula III may exist partially in the tautomeric ketonic form. It is also to be understood that although the preparations are described in terms of an alkyl chloroformate, other haloformic esters may be employed.)

The reactions proceeding from the carboxanilide compound (III) are believed to take place according to the following schematic representation:

The addition of the chloroformate may be carried out in a single portion or in several portions. The stirring is continued thereafter for a period up to several hours or for such time sufficient to complete the reaction with the formation of an alkali metal compound of Formula II and an alkali metal chloride by-product in the reaction mixture. Generally, a diester by-product, alkyl N-(4-alkoxycarbonyloxy-2-alkyl- 2H-1,2-benzothiazine-3-carbonyl)carbanilate 1,1-dioxide is also formed in minor amounts.

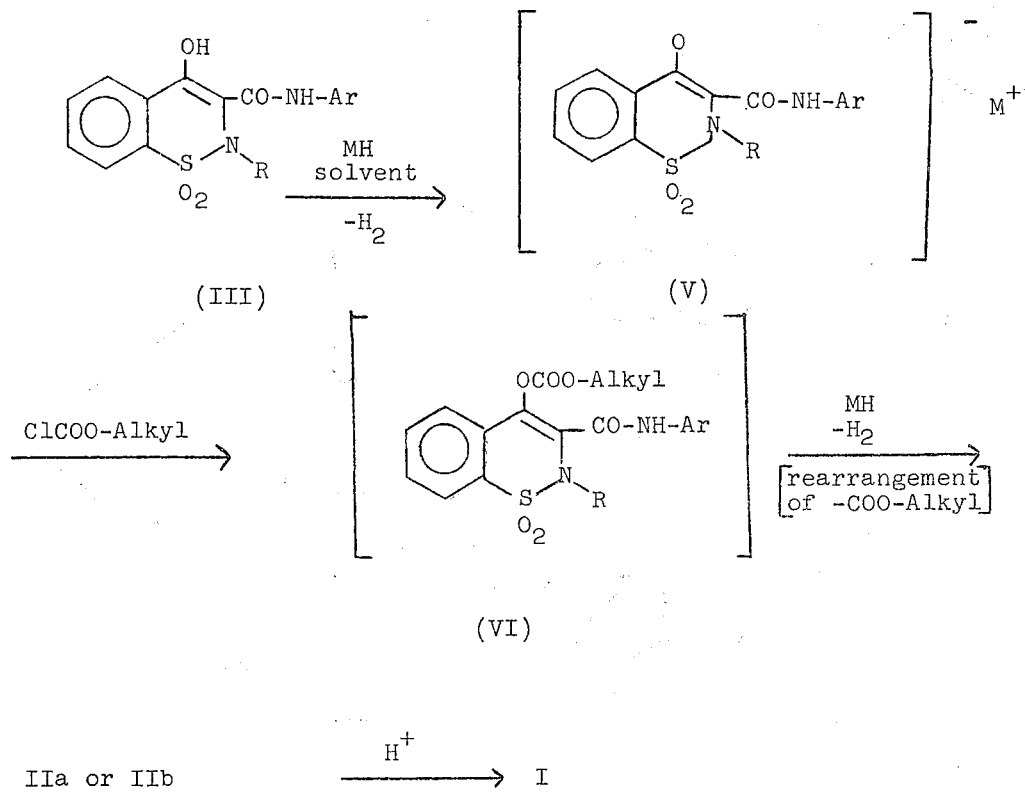

According to the foregoing, a carboxanilide compound (Formula III) when contacted with excess alkali metal hydride in an inert solvent forms a salt (V) with the evolution of hydrogen gas being observed. When chloroformic ester is added, the probable transient formation of the compound of Formula VI results which then reacts with another equivalent of metal hydride with hydrogen evolution followed by rearrangement of the -COO-Alkyl group to form the compound of IIa or IIb depending on the solvent. With or without isolation, the compound of IIa or IIb, when contacted with acid, cyclizes to the desired product of Formula I.

In the reaction for the preparation of the alkali metal derivative of alkyl N-(2-alkyl-4-hydroxy-2H-1,2-benzothiazine-3-carbonyl)carbanilate 1,1-dioxide (II) from the carboxanilide compound (III), a solution of the latter in an inert solvent is added to a slurry of alkali metal hydride preferably in the same solvent under substantially anhydrous conditions whereupon a reaction takes place with the evolution of hydrogen gas. The addition may be made in a portionwise manner over several minutes in the temperature range of from about 0°C. to about 50°C. It is conveniently carried out at ambient temperature. After substantially complete cessation of gas evolution, alkyl chloroformate (IV) is added with stirring whereupon a further evolution of gas occurs.

In the foregoing step, the alkali metal hydride is preferably sodium hydride although others such as lithium hydride and potassium hydride may be employed. (While other strong bases such as alkali metal amides may also be employed, these are less preferred). The amount of alkali metal hydride or base to be employed is about two or slightly greater than two molar proportions based on the amount of carboxanilide employed.

The alkyl chloroformate is employed in an amount substantially equimolar to the carboxanilide. Large excesses should not be employed since such excesses increase by-product diester formation. (The preparation of the novel diesters as primary products is the subject matter of co-pending application Ser. No. 508,117 filed concurrently herewith.)

A large number of inert solvents may be employed in carrying out the foregoing step. Suitable solvents include ethereal solvents such as dimethoxyethane, dioxane, tetrahydrofuran, and the like. Aromatic hydrocarbons such as benzene, toluenes, xylenes, etc., and other solvents such as dimethyl sulfoxide, dimethylformamide, hexamethyl phosphoric acid triamide, etc., may be employed to prepare IIa which is cyclized without isolation as hereinafter described. If it is desired to isolate the alkali metal derivative as a solvate (IIb), it is preferable to carry out the reaction in a polyethereal solvent such as dioxane, dimethoxyethane, etc., although the solvates may be prepared also by appropriate replacement of solvent as hereinafter described.

The reaction mixture obtained as above described and containing the alkali metal derivative may be employed without isolation or be isolated as a solvate (IIb) and thereafter cyclized in the presence of acid to obtain the desired 5-alkyl-3-aryl-2H,5H-1,3-oxazino-[5,6-c]1,2-benzothiazine-2,4(3H)-dione 6,6-dioxide product of Formula I.

When it is desired to isolate a solvate (IIb), the reaction mixture is treated in such a manner as to separate the alkai metal derivative from the inorganic halide by-product and thereafter recover the alkali metal derivative as a solvate from an appropriate solvent which may or may not be identical to the solvent employed in carrying out the reaction. Thus, even though the reaction is not carried out in a solvate forming solvent, a solvate may be prepared by replacing the solvent during the isolation step. Illustrative of two of the numerous variations that may be employed to prepare a solvate are the following procedures:

If the alkali metal derivative (II) is soluble in the reaction mixture while the by-product inorganic halide is of low solubility, the inorganic by-product is filtered off. The filtrate then is treated in a manner to remove some or all of the solvent (preferably subjected to reduced pressure), and the residue obtained is dissolved in a solvate-forming solvent. Thereafter, the resulting mixture empirically is equilibrated with atmospheric moisture with or without cooling whereupon the alkyl N-(2-alkyl-4-hydroxy-2H-1,2-benzothiazine 3-carbonyl)carbanilate 1,1-dioxide alkali metal derivative solvate (IIb) precipitates as a crystalline solid and may be recovered by conventional procedures. (Solvates are formed from some solvents without equilibration with atmospheric moisutre and from others after such treatment).

If both the alkali metal compound (II) and the inorganic halide are of low solubility in the reaction solvent, the solid mixture is recovered either by filtration or decantation and then stirred with a solvent in which the alkali metal compound is preferentially soluble to dissolve said compound. Thereafter, the insoluble inorganic halide is filtered off, and appropriate solvate forming solvent added to and admixed with the filtrate containing the alkali metal compound and the mixture then concentrated under reduced pressure to remove the non-solvate forming solvent. Additional solvate forming solvent then is added and the resulting mixture empirically equilibrated with air moisture to obtain and recover as previously described, the alkyl N-(2-alkyl-4-hydroxy-2H-1,2-benzothiazine-3-carbonyl)carbanilate 1,1-dioxide alkali metal derivative solvate (IIb).

The alkali metal compound of Formula II, including the solvates are novel compounds. Moreover, in addition to their utility as reactants for the preparation of the compounds of Formula I, they also have anti-inflammatory properties. Thus, these novel compounds comprise an additional feature of the present invention.

The cyclization reaction may be carried out by intimately admixing Compound II with a proton donating acid preferably in a solvent at moderate temperatures for time sufficient to complete the reaction with the formation of the desired 5-alkyl-3-aryl-2H,5H-1,3-oxazino-[5,6-c]1,2-benzothiazine-2,4(3H)-dione 6,6-dioxide product (I). Suitable temperatures for the reaction are in the range of from about 0° to about 40°C. It is conveniently carried out at ambient temperature. The time for reaction may be from about a few minutes to several hours. Various acids may be employed. Examples include organic acids such as acetic, propionic, methanesulfonic, benzoic, etc. as well as inorganic acids such a phosphoric, hydrochloric, sulfuric, etc. The preferred acid is glacial acetic acid. When the alkali metal compound is employed without isolation as IIa, the acid is added directly to the reaction mixture in which it was formed. When it is employed as a solvate (IIb), it is dissolved in a solvent and the acid added to the resulting solution. Suitable solvents include methanol, ethanol, isopropanol, propanol, tetrahydrofuran, dioxane, 1,2-dimethoxyethane, etc. Alkanols are preferred. When the product of Formula I is prepared from the solvate (IIb), it generally begins to precipitate from the acidic cyclization reaction mixture. When it is prepared from IIa by acidification in situ, the mixture is diluted with water, preferably ice-water, to precipitate the product. The product which is obtained according to the foregoing operations may be recovered and purified by conventional procedures.

The following examples illustrate the invention but are not to be construed as limiting.

EXAMPLE I

5-Methyl-3-phenyl-2H,5H-1,3-oxazino[5,6-c]-1,2-benzothiazine 2,4(3H)-dione 6,6-dioxide

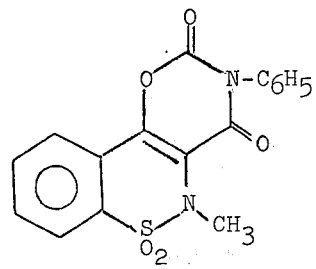

A 57 percent sodium hydride slurry in mineral oil (1.5 g and containing 0.86 g., 0.036 mole of NaH) was washed with pentane and slurried in 75 ml of dry ethylene glycol dimethyl ether. 4-Hydroxy-2-methyl-2H-1,2-benzothiazine-3-carboxanilide 1,1-dioxide,4.95 g (0.015) mole, was added to the slurry while stirring over a period of 5 minutes. During the addition, a reaction took place with the evolution of hydrogen gas and the formation of the sodium derivative of the benzothiazine dioxide. After the evolution of hydrogen had substantially ceased, 1.80 g (0.0165 mole) of ethyl chloroformate was added over a period of one minute and the reaction mixture stirred for three hours. Thereafter, an additional 0.5 ml portion of the chloro ester was added and stirring continued to complete formation of ethyl N-(4-hydroxy-2-methyl-2H-1,2-benzothiazine-3-carbonyl)carbanilate 1,1-dioxide, sodium derivative intermediate and ethyl N-(4-ethoxycarbonyloxy-2-methyl-2H-1,2-benzothiazine-3-carbonyl)-carbanilate 1,1-dioxide by-product as evidenced by the disappearance of the starting material. Glacial acetic acid (10 ml) was then added to the reaction mixture and the mixture stirred for about 10 minutes. Thereafter, the mixture was heated under reduced pressure to evaporate the solvent. The heating was continued for 15 minutes after apparent dryness had been achieved. Ice water was then added to the residue and the solid recovered by filtration and recrystallized from acetone to obtain the desired 5-methyl-3-phenyl-2H,5H-1,3-oxazino[5,6-c]1,2-benzothiazine-2,4(3H)-dione 6,6-dioxide product of m.p. 259°–261°C.

Anal. Calcd. for C$_{17}$H$_{12}$N$_2$O$_5$S: C, 57.30; H, 3.39 S, 9.00
Found: C, 57.41; H, 3.50; S, 9.18

EXAMPLE II

Ethyl N-(4-hydroxy-2-methyl-2H-1,2-benzothiazine-3-carbonyl)carbanilate 1,1-dioxide, sodium derivative, 1,2-dimethoxyethane solvate

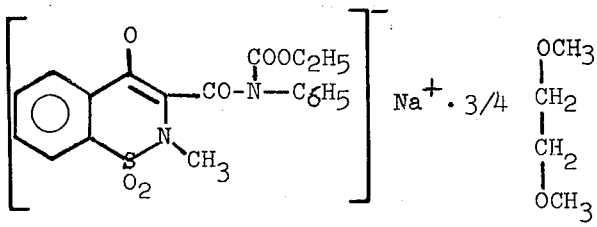

A sodium hydride slurry was prepared by washing 2.95 g. of 57 percent NaH in mineral oil with pentane and then covering with 100 ml. of dry 1,2-dimethoxyethane. 4-Hydroxy-2-methyl-2H-1,2-benzothiazine-3-carboxanilide 1,1-dioxide, 9.91 g (0.03 mole), was added over several minutes to the sodium hydride [1.69 g. (0.07 mole)] slurry whereupon a reaction took place with the evolution of hydrogen gas. After the hydrogen evolution had ceased, 3.58 g. (0.033 mole) of ethyl chloroformate was added in a single portion whereupon hydrogen was again evolved. Thereafter the mixture was stirred for about 1.5 hours to complete the reaction with the formation as a precipitate of the intermediate sodium derivative solvate of ethyl N-(4-hydroxy-2-methyl-2H-1,2-benzothiazine-3-carbonyl)-carbanilate 1,1-dioxide and sodium chloride by-product. The mixed solids were filtered off, and stirred with acetone whereupon the intermediate sodium derivative solvate dissolved leaving the sodium chloride which was filtered off. One hundred milliliters of dry 1,2-dimethoxyethane were added to the filtrate and the mixture concentrated under reduced pressure to remove the acetone. The remaining solution was rediluted with 100 milliliters of dimethoxyethane and cooled to obtain the ethyl N-(4-hydroxy-2-methyl-2H-1,2-benzothiazine-3-carbonyl)carbanilate 1,1-dioxide, sodium derivative, 1,2-dimethoxyethane solvate, m.p. 155°–160°C (dec.) in a yield of 10.47 g. or 71 percent of theoretical.

Anal. Calcd. for C$_{19}$H$_{17}$N$_2$O$_6$S.Na.¾C$_4$H$_{10}$O$_2$:
C, 52.71; H, 5.02; N, 5.69; S, 6.52
Found: C, 53.70; H, 5.11; N, 5.58; S, 6.66

EXAMPLE III

5-Methyl-3-phenyl-2H,5H-1,3-oxazino-[5,6-c]1,2-benzothiazine-2,4(3H)-dione-6,6-dioxide Ethyl N-(4-hydroxy-2-methyl-2H-1,2 benzothiazine-3-carbonyl)-carbanilate 1,1-dioxide, sodium derivative, 1,2-dimethoxyethane solvate, 4.92 g (0.01 mole), was dissolved in 25 ml methanol. To the resulting solution, 2 ml of glacial acetic acid was added whereupon a reaction occurred with the formation of the 5-methyl-3-phenyl-2H,5H-1,3-oxazino[5,6-c]1,2-benzothiazine-2,4(3H)-dione 6,6-dioxide product which started to precipitate in the reaction mixture. The reaction mixture was allowed to stand at room temperature for 15 minutes to complete the formation of the product which was identical in all respects with that described in Example I. The yield of the product was 3.35 g or 94 percent of theory.

EXAMPLE IV

Ethyl N-(4-hydroxy-2-methyl-2H-1,2-benzothiazine-3-carbonyl)carbanilate 1,1-Dioxide, Sodium Derivative, Dioxane Solvate, Hemihydrate A slurry of sodium hydride in tetrahydrofuran was prepared by adding 50 ml of pentane to 4.63 g (0.11 mole) of a 57 percent sodium hydride suspension in mineral oil, decanting off the mineral oil and then adding 150 ml of dry tetrahydrofuran. To the slurry thus prepared was added with stirring, 16.52 g (0.05 mole) of 4-hydroxy-2-methyl-2H-1,2-benzothiazine-3-carboxanilide 1,1-dioxide over a period of about 5 minutes while evolution of hydrogen occurred; stirring was continued for an additional 15 minutes after apparent cessation of gas evolution. Thereafter, 5.43 g (0.05 mole) of ethyl chloroformate in 20 ml tetrahydrofuran was added over a period of about five minutes whereupon additional evolution of hydrogen occurred. Stirring was continued for about 3 hours to complete the reaction with the formation of the sodium derivative of ethyl N-(4-hydroxy-2-methyl-2H-1,2-benzothiazine-3-carbonyl)carbanilate 1,1-dioxide which remained in solution and sodium chloride by-product which precipitated in the reaction mixture. The latter was filtered off, and the filtrate subjected to reduced pressure to remove the solvent and recover the sodium derivative as a gummy yellow residue. Dioxane was stirred into the residue and the mixture exposed to atmospheric moisture whereupon ethyl N-(4-hydroxy-2-methyl-2H-1,2-benzothiazine-3-carbonyl)carbanilate 1,1-dioxide, sodium derivative, dioxane solvate separated as a crystalline hemihydrate.

Anal. Calcd for C$_{19}$H$_{17}$NaN$_2$O$_6$S.C$_4$H$_8$O$_2$.½H$_2$O:
C, 52.97; H, 5.02; N, 5.37; S, 6.15
Found: C, 53.07; H, 4.94; N, 5.37; S, 6.36

EXAMPLE V

5-Ethyl-3-phenyl-2H,5H-1,3 oxazino [5,6-c]1,2-benzothiazine 2,4(3H)-dione 6,6-dioxide In an operation carried out in a manner similar to that described in Example I, 5.16 g (0.015 mole) of 4-hydroxy-2-ethyl-2H-1,2-benzothiazine-3-carboxanilide 1,1-dioxide is added to a slurry of 0.86g (0.036 mole) of sodium hydride in 75 ml of dry ethylene glycol dimethyl ether, followed by 1.80 g (0.0165 mole) of ethyl chloroformate to obtain ethyl N-(4-hydroxy-2-ethyl-2H-1,2 benzothiazine-3-carbonyl)carbanilate 1,1-dioxide, sodium derivative intermediate in the reaction mixture. Ten milliliters of glacial acetic acid is then added and the mixture stirred to obtain the desired 5-ethyl-3-phenyl-2H,5H-1,3-oxazino [5,6-c]1,2-benzothiazine 2,4(3H)-dione 6,6-dioxide product of m.w. 370.

EXAMPLE VI

In reactions carried out in a manner similar to that described in Examples I and V except for the substitution of an appropriate 4-hydroxy-2-alkyl-2H-1,2-benzothiazine-3-carboxanilide 1,1-dioxide of Formula III, as starting material, the following compounds may be prepared:

5-Methyl-3-(p-tolyl)-2H,5H-1,3-oxazino[5,6-c]1,2-benzothiazine-2,4(3H)-dione 6,6-dioxide;

5-Methyl-3-(p-chlorophenyl)-2H,5H-1,3-oxazino[5,6-c]1,2-benzothiazine-2,4(3H)-dione 6,6-dioxide;

5-Methyl-3-(p-methoxyphenyl)-2H,5H-1,3-oxazino[5,6-c]1,2-benzothiazine-2,4(3H)-dione 6,6-dioxide;

5-Ethyl-3-(p-trifluoromethylphenyl)-2H,5H-1,3-oxazino[5,6-c]1,2-benzothiazine-2,4(3H)-dione 6,6-dioxide;

5-Methyl-3-(o-ethoxyphenyl)-2H,5H-1,3-oxazino[5,6-c]1,2-benzothiazine-2,4(3H)-dione 6,6-dioxide;

5-Methyl-3-(2,5-dichlorophenyl)-2H,5H-1,3-oxazino[5,6-c]1,2-benzothiazine-2,4(3H)-dione 6,6-dioxide;

5-Methyl-3-(o-methoxyphenyl)-2H,5H-1,3-oxazino[5,6-c]1,2-benzothiazine-2,4(3H)-dione 6,6-dioxide;

5-Ethyl-3-(m-chlorophenyl)-2H,5H-1,3-oxazino[5,6-c]1,2-benzothiazine-2,4(3H)-dione 6,6-dioxide;

5-Ethyl-3-(3,4-dichlorophenyl)-2H,5H--oxazino[5,6-c]1,2-benzothiazine-2,4(3H)-dione 6,6, dioxide;

5-Ethyl-3-(o-chlorophenyl)-2H,5H-1,3-oxazino[5,6-c]1,2-benzothiazine-2,4(3H)-dione 6,6-dioxide;

5-Ethyl-3-(p-fluorophenyl)-2H,5H-1,3-oxazino[5,6-c]1,2-benzothiazine-2,4(3H)-dione 6,6-dioxide;

5-Ethyl-3-(p-bromophenyl)-2H,5H-1,3-oxazino[5,6-c]1,2-benzothiazine-2,4(3H)-dione 6,6-dioxide;

5-Methyl-3-(2,4-dichlorophenyl)-2H,5H-1,3-oxazino[5,6-c]1,2-benzothiazine-2,4(3H)-dione 6,6-dioxide;

5-Methyl-3-(2,4-dimethoxyphenyl)-2H,5H-1,3-oxazino[5,6-c]1,2-benzothiazine-2,5(3H)-dione 6,6-dioxide;

5-Methyl-3-(5-chloro-2methylphenyl)-2H,5H-1,3-oxazino[5,6-c]1,2-benzothiazine-2,4(3H)-dione 6,6-dioxide;

5-Methyl-3-(2,5-difluorophenyl)-2H,5H-1,3-oxazino[5,6-c]1,2-benzothiazine-2,4(3H)-dione 6,6-dioxide;

5-Ethyl-3-(5-fluoro-2-methylphenyl)-2H,5H-1,3-oxazino[5,6-c]1,2-benzothiazine-2,4(3H)-dione 6,6-dioxide;

5-Methyl-3-(2-chloro-5-trifluoromethylphenyl)-2H,5H-1,3-oxazino[5,6-c]1,2-benzothiazine-2,4(3H)-dione 6,6-dioxide;

5-Methyl-3-(4-bromo-2-trifluoromethylphenyl)-2H,5H-1,3-oxazino[5,6-c]1,2-benzothiazine-2,4(3H)-dione 6,6-dioxide;

5-Methyl-3-(3-chloro-4-fluorophenyl)-2H,5H-1,3-oxazino[5,6-c]1,2-benzothiazine-2,4(3H)-dione 6,6-dioxide;

5-Methyl-3-(5-chloro-2-methylphenyl)-2H,5H-1,3-oxazino]5,6-c]1,2-benzothiazine-2,4(3H)-dione 6,6-dioxide;

5-Methyl-3-(2-fluoro-5-methylphenyl)-2H,5H-1,3-oxazino[5,6-c]1,2-benzothiazine-2,4(3H)-dione 6,6-dioxide;

5-Methyl-3-(4-fluoro-2-trifluoromethylphenyl)-2H,5H-1,3-oxazino[5,6-c]1,2-benzothiazine-2,4(3H)-dione 6,6-dioxide.

5-Methyl-3-(2-methoxy-5-methylphenyl)-2H,5H-1,3-oxazino[5,6-c]1,2-benzothiazine-2,4(3H)-dione 6,6-dioxide.

EXAMPLE VII

In reactions carried out in a manner similar to that described in Examples II and IV, solvates of the following alkali metal compounds may be prepared:

Ethyl N-(4-hydroxy-2-methyl-2H-1,2-benzothiazine-3-carbonyl)-4'-methoxycarbanilate 1,1-dioxide, sodium derivative.

Ethyl N-(4-hydroxy-2-methyl-2H-1,2-benzothiazine-3-carbonyl)-4'-trifluoromethylcarbanilate 1,1-dioxide, sodium derivative.

Ethyl N-(4-hydroxy-2-methyl-2H-1,2-benzothiazine-3-carbonyl)-2', 5'-dichlorocarbanilate 1,1-dioxide, sodium derivative.

Methyl N-(2-ethyl-4-hydroxy-2H-1,2-benzothiazine-3-carbonyl)-5'-fluoro-3'-methylcarbanilate 1,1-dioxide, sodium derivative.

Methyl N-(2-ethyl-4-Hydroxy-2H-1,2-benzothiazine-3-carbonyl)-2', 4'-dimethoxycarbanilate 1,1-dioxide, sodium derivative.

Methyl N-(4-hydroxy-2-methyl-2H-1,2-benzothiazine-3-carbonyl)-3'-chloro-4'-fluorocarbanilate 1,1-dioxide, sodium derivative.

Ethyl N-(4-hydroxy-2-methyl-2H-1,2-benzothiazine-3-carbonyl)-4'-bromo-2'-trifluoromethylcarbanilate 1,1-dioxide, sodium derivative.

EXAMPLE VIII

5-Methyl-3-(m-toly)-2H,5H-1,3-oxazino[5,6-c]1,2-benzothiazine-2,4(3H)-dione 6,6-dioxide In an operation carried out in a manner similar to that described in Examples I and V, 5.16 g (0.015 mole) of 2,3'-dimethyl-4-hydroxy-2H-1,2-benzothiazine-3-carboxanilide 1,1-dioxide is added to a slurry of 0.86 g (0.036 mole) of sodium hydride in 75 ml of dry ethylene glycol dimethyl ether, followed by 1.80 g (0.0165 mole) of ethyl chloroformate to obtain ethyl N-(2,3'-dimethyl-4-hydroxy-2H-1,2-benzothiazine-3-carbonyl)carbanilate 1,1-dioxide, sodium derivative intermediate in the reaction mixture. Ten milliliters of glacial acetic acid then is added and the mixture stirred to obtain the desired 5-methyl-3-(m-tolyl)2H,5H-1,3-oxazino[5,6-c]1,2-benzothiazine 2,4(3H)-dione 6,6-dioxide of m.w. 370.

EXAMPLE IX

5-Ethyl-3-(m-methoxy)-2H,5H-1,3-oxazino[5,6-c]1,2-benzothiazine-2,4(3H)-dione 6,6-dioxide In a similar operation, 5.6 g (0.015 mole) of 2-ethyl-4-hydroxy-3'-methoxy-2H-1,2-benzothiazine-3-carboxanilide 1,1-dioxide is added to a slurry of 0.86 g (0.036 mole) of sodium hydride in 75 ml of dry ethylene glycol dimethyl ether, followed by 1.80 g (0.0165 mole) of ethyl chloroformate to obtain ethyl N-(2-ethyl-4-hydroxy-3'-methoxy-2H-1,2-benzothiazine-3-carbonyl)carbanilate 1,1-dioxide sodium derivative intermediate in the reaction mixture. Ten milliliters of glacial acetic acid then is added and the mixture stirred to obtain the desired 5-ethyl-3-(m-methoxy)-2H,5H-1,3-oxazino[5,6-c]1,2-benzothiazine-2,4(3H)-dione 6,6-dioxide.

The oxazino-benzothazine 6,6-dioxide products of the present invention as well as the novel 4-hydroxy-2-alkyl-3[(N-lower alkoxycarbonyl)arylcarbamyl]2H-1,2-benzothiazine 1,1-dioxide, alkali metal derivatives show inhibition in bacteria induced rat paw edema assay which indicates anti-inflammatory-activity. A representative operation showing anti-inflammatory activity is the M. butyricum induced rat paw edema assay. In this test, 160–190 gram rats which previously had been injected subcutaneously in one hind paw with 0.75 mg of M. butyricum and in which by the eleventh day there had been induced edema of at least 0.25 ml were employed. Test animals were separately dosed daily for 4 days thereafter with 5-methyl-3-phenyl-2H,5H-1,3-oxazino[5,6-c]1,2-benzothiazine-2,4(3H)-dione 6,6-dioxide and with ethyl N-(4-hydroxy-2-methyl-2H-1,2-benzothiazine-3-carbonyl)carbanilate 1,1-dioxide sodium derivative, 1,2-dimethoxyethane solvate at a dose of 50 mg/kg (per os) while control animals were given saline. Comparison of the paw sizes of treated and control on the first and fifth days showed edema inhibition in the treated animals of 44 percent and 61.5 percent respectively. Similarly, edema inhibition may be observed employing the subject compounds at dosages in the range of from about 0.5 to about 100 mg/kg.

Another property shown by the alkali metal compounds is an antinociceptive effect which renders them useful as components in analgesic preparations. Antinociceptive properties of Formula I compounds may be seen in the mouse writhing test employing the method reported in Br. J. Pharmac. Chemother. 32, 295–310 (1968). In a representative operation, mice were treated orally with ethyl N-(4-hydroxy-2-methyl-2H-1,2benzothiazine-3-carbonyl)carbanilate 1,1-dioxide, sodium derivative, 1,2-dimethoxyethane solvate at a dose of 8.5 to 22 mg/kg. After 20 minutes the mice which had been injected with the test compounds and untreated controls were injected intraperitoneally with acetyl choline bromide (5.5 mg./kg.) and the abdominal constriction responses compared. It was found that ethyl N-(4-hydroxy-2-methyl-2H-1,2-benzothiazine-3-carbonyl)carbanilate 1,1-dioxide, sodium derivative, 1,2-dimethoxyethane solvate was effective in reducing the abdominal constriction responses.

The 2-alkyl-4-hydroxy-2H-1,2-benzothiazine-3-carboxanilide 1,1-dioxide compounds (III) which are starting materials for the preparation of the alkali metal compounds of Formula II which in turn are the starting materials for the compounds of Formula I, are compounds described in the literature or may be prepared readily by methods described in the literature. Thus, the compounds of Formula III may be prepared from 2-alkyl-2H-1,2-benzothiazin-4(3H)-one 1,1-dioxide (VII) and aryl isocyanate (ArN=C=O), in the presence of sodium hydride (1) by adding a solution of Compound VII and aryl isocyanate in an inert solvent such as dimethylformamide to a slurry of sodium hydride at ambient temperature or adding Compound VII portionwise to a mixture of the isocyanate and a alkali metal hydride, and (2) by pouring the resulting reaction mixture into a slightly acidic ice water to precipitate the compound of Formula III:

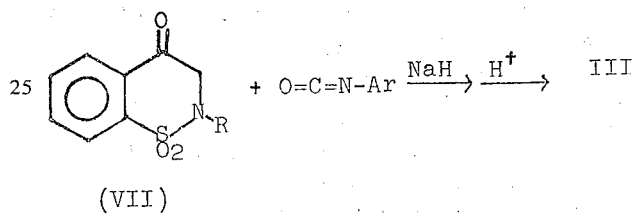

(VII)

Alternatively, it may be reacting a N-alkyl derivative of alkyl 4-hydroxy-2H-1,2-benzothiazine-3-carboxylate-1,1-dioxide (VIII) with an appropriately substituted aniline at elevated temperatures (about 120°–150°C) for from several hours to several days in the presence of p-toluenesulfonic acid catalyst and preferably under nitrogen atmosphere:

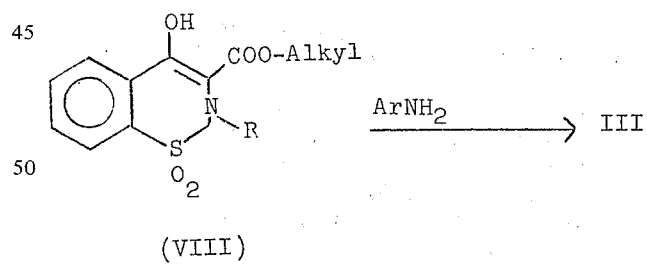

(VIII)

The operations represented by the foregoing equations as well as a method used to prepare 2-alkyl-4-hydroxy-3-(lower alkoxycarbonyl)-2H-1,2-benzothiazine 1,1-dioxide (VIII) may be found in U.S. Pat. Nos. 3,501,466 and 3,591,584.

Numerous chloroformic esters are commercially available. Other alkyl chloroformates may be prepared from the appropriate alcohol and phosgene by methods well known to the skilled in the art.

What is claimed is:
1. A compound represented by the formula

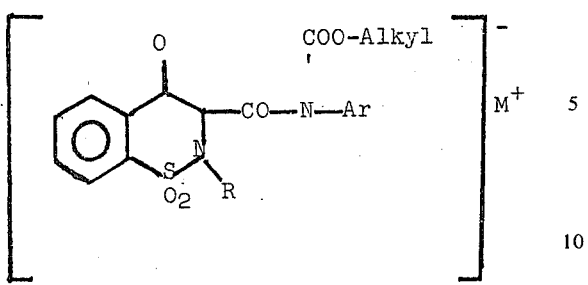

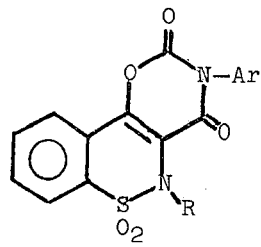

wherein R is lower alkyl and Ar is an aryl radical selected from the group consisting of phenyl and substituted phenyl, wherein the substituent in said substituted phenyl is selected from the group consisting of lower alkyl, lower alkoxy, halo and trifluoromethyl.

2. A compound according to claim 1 which is 5-methyl-3-phenyl-2H,5H-1,3-oxazino[5,6-c]1,2-benzothiazine-2,4(3H)-dione 6,6-dioxide.

3. A compound represented by the formula:

wherein M is an alkali metal, R is lower alkyl and Ar is phenyl or substituted phenyl wherein the substituent in said substituted phenyl is selected from the group consisting of lower alkyl, lower alkoxy, halo and trifluoromethyl; and solvates thereof, said solvates being selected from the group consisting of (a) a solvate from an ethereal solvent and (b) a solvate from an ethereal solvent and also having water of hydration.

4. A compound according to claim 3 which is ethyl N-(4-hydroxy-2-methyl-2H-1,2-benzothiazine-3-carbonyl) carbanilate 1,1-dioxide, sodium derivative, 1,2-dimethoxyethane solvate.

5. A compound according to claim 3 which is ethyl N-(4-hydroxy-2-methyl-2H-1,2-benzothiazine-3-carbonyl)carbanilate 1,1-dioxide, sodium derivative, dioxane solvate, hemihydrate.

* * * * *

UNITED STATES PATENT AND TRADEMARK OFFICE
CERTIFICATE OF CORRECTION

PATENT NO. : 3,923,801
DATED : December 2, 1975
INVENTOR(S) : Rasmussen, Chris

It is certified that error appears in the above—identified patent and that said Letters Patent are hereby corrected as shown below:

In Column 7, line 54, delete the dash after 3-carbonyl).

In Column 13, claim 1, the formula shown should be the formula for claim 3.

In Column 14, claim 3, the formula shown should be the formula for claim 1.

Signed and Sealed this

Twenty-first Day of December 1976

[SEAL]

Attest:

RUTH C. MASON
*Attesting Officer*

C. MARSHALL DANN
*Commissioner of Patents and Trademarks*